United States Patent [19]

Imai et al.

[11] 4,403,350

[45] Sep. 6, 1983

[54] INTERFERENCE AVOIDANCE ELECTRONIC SYSTEM FOR AN AUTOMOTIVE VEHICLE

[75] Inventors: Iwao Imai, Yokosuka; Masazumi Sone, Tokyo, both of Japan

[73] Assignee: Nissan Motor Company Limited, Yokohama, Japan

[21] Appl. No.: 255,488

[22] Filed: Apr. 20, 1981

[30] Foreign Application Priority Data

Apr. 24, 1980 [JP] Japan .................................. 55-53606

[51] Int. Cl.³ ............................................. H04B 1/10
[52] U.S. Cl. .................................... 455/297; 328/165
[58] Field of Search ........................ 455/297; 328/165

*Primary Examiner*—John S. Heyman

*Attorney, Agent, or Firm*—Schwartz, Jeffery, Schwaab, Mack, Blumenthal & Koch

[57] ABSTRACT

An electronic system for controlling engine parameters or the like such as the amount of fuel supplied to the internal combustion engine of an automotive vehicle having a radio receiver, the control system having a plurality of digital processing units such as microcomputers, where each unit operates in synchronization with a clock pulse. There is provided a clock pulse generator for each digital processing unit, the frequency of which is selected so that the higher harmonics of one clock pulse has a frequency difference of 10 KHz or more from the higher harmonics of other clock pulses in a broadcast band, whereby interference which can disturb the reception of a broadcast signal is avoided.

14 Claims, 10 Drawing Figures

AUTOMOTIVE VEHICLE

INTERFERENCE AVOIDANCE ELECTRONIC SYSTEM FOR AN AUTOMOTIVE VEHICLE

BACKGROUND OF THE INVENTION

1. Field of the Invention

The present invention relates to an electronic system which may be mounted in an automotive vehicle for avoiding noise, especially interference noise generated from a plurality of digital processing units constituting microcomputers incorporated in the electronic system, from disturbing, external communication equipment, such as a radio set mounted in the same automotive vehicle, from receiving a broadcast signal.

2. Description of the Prior Art

In recent years, with the rapid growth of the electronics technology, a plurality of microcomputers are being mounted in automotive vehicles for controlling operations of the associated internal combustion engines or various electrical devices. Rectangular or other shape clock pulses having frequencies of several hundred KHz to several MHz, are commonly used for timing signals for microcomputer operation. The clock pulses may comprise a fundamental of a relatively large magnitude (several volts) and harmonic components, the frequencies of which range through a considerable portion of the broadcast frequency spectrum, from the amplitude modulating broadcasting frequencies (the AM band) through the television channel frequencies (VHF and UHF bands) to the frequency modulated broadcasting frequencies (FM band). Therefore, the rectangular clock pulse can function as a noise source with regard to the receivers. These broadcast frequency noise components are fed into the I/O signal lines and power line of the microcomputer, a radio set or other receiver in the vehicle may suffer interference due to direct or indirect coupling of the radio harness of the radio antenna with the I/O signal lines and power line.

Experiments have revealed that when a plurality of microcomputers are mounted in the same vehicle and the frequencies of the harmonic components of the rectangular clock pulses used in the microcomputers are close and are in the FM broadcasting band, an extremely high level of interference will be produced if the plurality of microcomputers are operated simultaneously because of interference between the harmonic components from each of the clock pulses.

In order to prevent the noise components causing this disturbance from leaking out of the I/O signal and power lines, it is necessary, especially in the high frequency band, to completely isolate that part of each microcomputer which is operated by the clock pulse from that part which is not operated by the clock pulse. However, this is not practical, either technically or economically.

There are two additional ways for preventing electromagnetic coupling between the signal lines, into which the noise components from the clock pulses are leaked, to the radio harness and the antenna.

(a) Shielded wires such as coaxial cables may be used for all or part of the signal lines; or (b) The signal lines may be wired separately from the radio harness or the antenna.

However, neither of these alternatives is practical when there are a large number of signal lines and the wiring of the signal lines becomes very complicated, or when the signal lines are distributed over almost the entire automotive vehicle body.

SUMMARY OF THE INVENTION

With the above-described problem in mind, it is an object of the present invention to provide an electronic control system for an automotive vehicle having a plurality of digital processing units which are operated by a plurality of clock pulses which may prevent radio or other receiving equipment mounted in the automotive vehicle from being disturbed by interference caused by the higher harmonics from each of the plurality of clock pulses by setting the oscillation frequency of each clock pulse so that the frequency difference between the higher harmonics of the clock pulses is 10 KHz or more.

BRIEF DESCRIPTION OF THE DRAWINGS

The features and advantages of the interference avoidance electronic system according to the present invention will be better appreciated from the following description taken in conjunction with the accompanying drawings in which like reference numerals denote corresponding elements, and in which.

DETAILED DESCRIPTION OF THE PREFERRED EMBODIMENT

Reference will be made to the drawings, and first to FIG. 1 which shows diagrammatically a microcomputer adapted to be installed in an automotive vehicle to control the operation of an internal combustion engine or other device.

Figure 1:
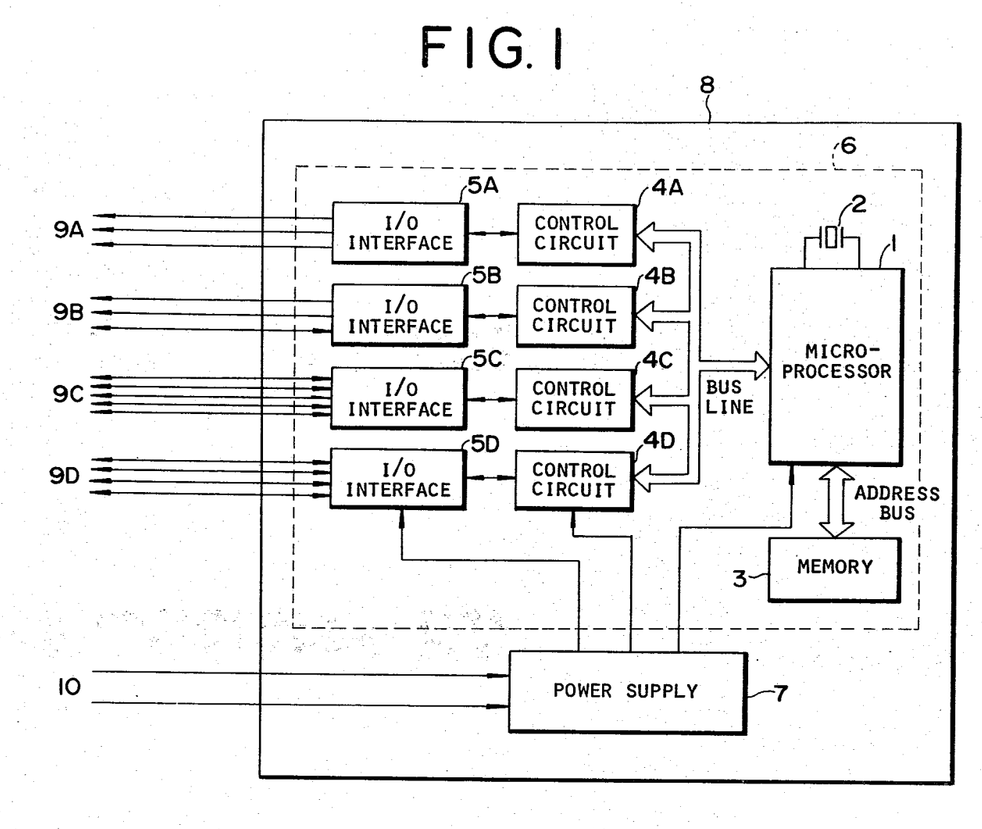
FIG. 1 is a block diagram illustrating an exemplary of a microcomputer configuration mounted in an automotive vehicle.

In FIG. 1, numeral 1 denotes a microprocessor, numeral 2 denotes a clock pulse generator using a crystal oscillator. The microprocessor 1 obtains a periodic rectangular clock pulse whose rise and fall times are between several nanoseconds and several tens of nanoseconds by shaping the oscillation output of the crystal oscillator. Numeral 3 denotes a memory. Numerals 4A to 4D denote control circuits. Numerals 5A to 5D denote I/O interface groups in which an A/D converter, a D/A converter, and level amplifiers for various sensors are incorporated.

The memory 3, control circuits 4A to 4D, and I/O interface groups 5A to 5D are supplied with the clock pulse or a logical signal corresponding to the clock pulse and a memory control signal (i.e., programmable clock, etc.).

A digital block 6 comprising the above-described elements 1, 2, 3, 4A to 4D, and 5A to 5D, is housed in a metallic casing 8 together with a power supply 7. Numerals 9A to 9D denote I/O signal lines and numeral 10 denotes a power supply line.

The metallic casing 8 is installed in a place where environmental requirements such as temperature, and humidity are appropriate, e.g., under an instrument panel or under a seat within the passenger compartment of the automotive vehicle.

The I/O signal lines 9A to 9D transmit to the I/O interfaces of the digital block 6, those input signals from various sensors required for calculating certain control parameters of the engine, after digital processing, output signals for controllin the operation of the engine, various electrical appliances, and actuators.

Usually, the I/O signals transmitted through the I/O signal lines have frequencies ranging from zero to several KHz and the signal and power supply lines are bundled in a harness along with lines for other electrical appliances by conventional means such as polyvinyl chloride covered wires. Because of such wiring, the I/O signal lines, 9A to 9D of the microcomputer system, are closely coupled with the lines of other electrical applicances; as, for example in the first and second harnesses 14 and 15 of FIG. 2 wherein the radio receiving equipment 11 and the antennas (in this case glass antennas buried in the front and rear windshields) 12 and 13 respectively are connected in a high frequency band with the I/O lines due to induction or electromagnetic radiation.

Figure 2:
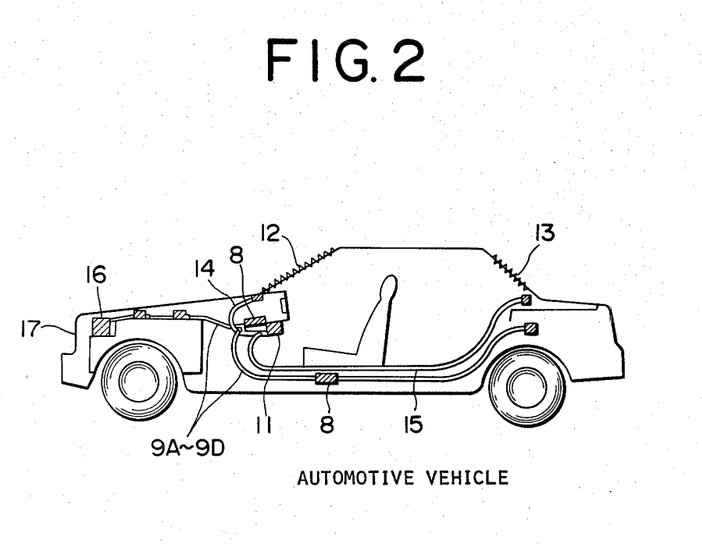
FIG. 2 is a wiring diagram of the microcomputer shown in FIG. 1 mounted in the automotive vehicle body.
Figure 3:
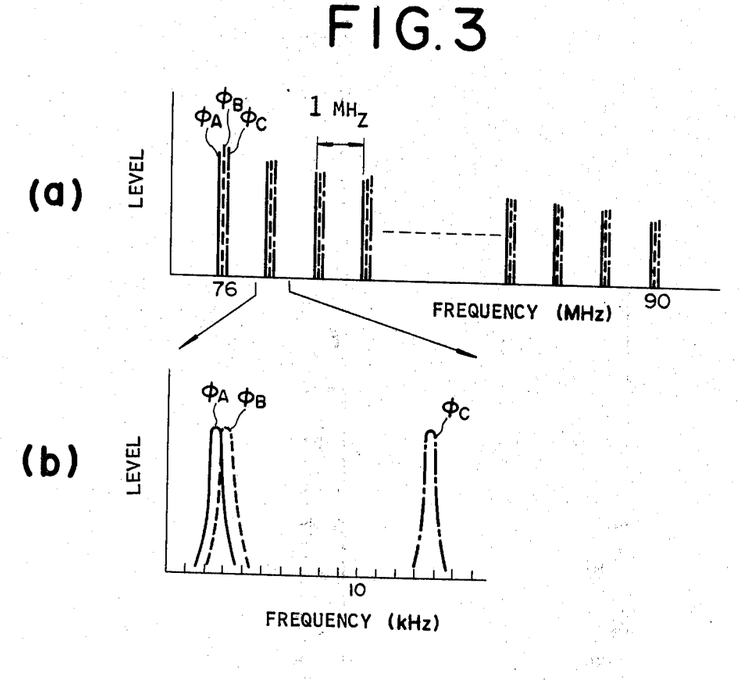
FIG. 3(a) is a graph of frequency spectra of the higher harmonics of a clock pulse, particularly those within the FM broadcasting band.
FIG. 3(b) is a partial enlargement of FIG. 3(a)

Furthermore, since the microcomputer uses the same power supply as the receiving equipment and both use the vehicle body 17 as a common ground, the microcomputer and receiving equipment are coupled with each other electromagnetically through these power and ground lines.

As explained above, a clock pulse, having a frequency of between several hundred KHz and several MHz, used as a synchronous timing signal on which the microcomputer is operated, comprises a high-level fundamental wave and its associated harmonics will have frequencies ranging from zero to an extremely high frequency (including the AM, FM and TV broadcasting bands).

Therefore, the clock pulse signal constitutes a noise source which can disturb the radio receiving equipment due to direct or indirect coupling of the I/O signal lines and power lines with the radio harness and antenna when the noise components (i.e., broadcast band frequencies) of the harmonics are introduced by the I/O signal lines 9A to 9D and the power line 10 into the radio harness and antenna.

When a plurality of microcomputers are mounted in a vehicle and the harmonic frequency of the clock pulses of one microcomputer is near that of the other and in the FM broadcasting band, considerable high-level noise may appear in the receiving equipment if the microcomputers are operated simultaneously (as compared to the case where the microcomputers are operated separately in time). As more fully explained below, this high-level noise generation has been found and confirmed experimentally.

To prevent the introduction of noise components into the I/O signal lines and power line, it is necessary to completely isolate that portion of the system which operates on one of the clock pulses from the other portions (the I/O interface group and power supply, etc.), especially in the high frequency range. However, such isolation is not practicable technically and economically.

There are other ways of preventing the coupling of noise components from the clock pulse to a radio receiving frequency, specifically:
(a) Shielded wires such as coaxial cables can be used as signal lines, or alternatively all of the signal lines can be entirely shielded; or
(b) The signal lines can be separated from the radio harness or antenna as far as space permits.

However, the above-described preventive methods are not practicable when there are many signal lines or the wiring of the signal lines is complicated or when the signal lines are distributed over the entire vehicle body.

Described hereinafter and in FIGS. 3(a) to 10(b) is a preferred embodiment of the present invention for avoiding noise interference, based upon experiments on the measurement of interference noise.

FIG. 3(a) shows the frequency spectra of higher harmonics within an FM broadcasting band (from 76 MHz to 90 MHz in this drawing). The broadest frequency band width is different in different countries e.g., in the U.S.A. it ranges from 88 MHz to 108 MHz. In the drawing three clock pulses $\phi_A$, $\phi_B$, and $\phi_C$ are used in connection with a plurality of microcomputers A, B, and C, respectively ($\phi_A$ is indicated by solid lines, $\phi_B$ by dashed lines, and $\phi_C$ by dot-dashed lines).

As will be appreciated by the artisan, when the clock pulse frequencies are set at 1 MHz band, high-order harmonics appear at 1 MHz intervals.

As shown enlarged in FIG. 3(b), the spectrum frequencies of $\phi_A$ and $\phi_B$ are close together. When the microcomputers A and B are mounted in an automotive vehicle and operated simultaneously, a considerable level of noise is generated in radio receiving equipment mounted in the vehicle as compared to the noise generated when the microcomputers are operated separately (i.e., not simultaneously).

According to the present invention, when the clock frequencies of the microcomputers A and C are separated so that the frequency spectra of the higher harmonics are separated by 10 KHz or more, the higher noise (interference noise) is suppressed to the extent that it is as low as if the microcomputers A and C were operating separately and not simultaneously, even if the microcomputers A and C are operating simultaneously.

The interference noise will now be described on the basis of experimental data.

Figure 4:
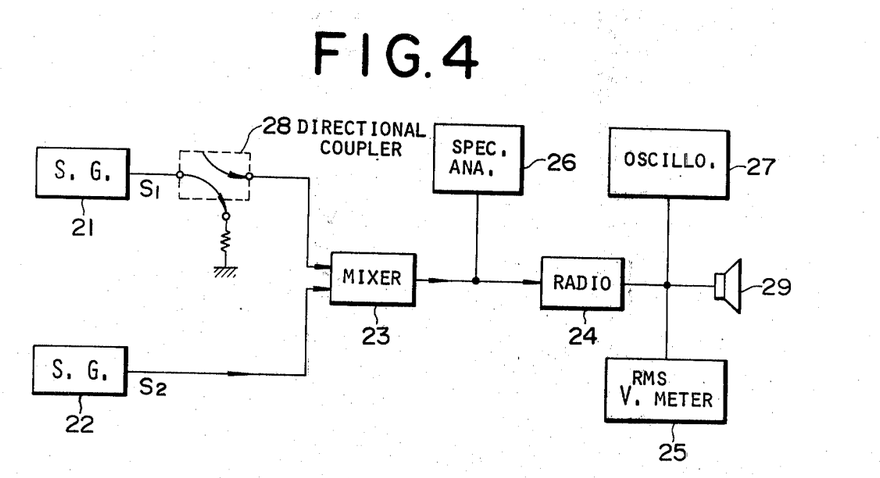
FIG. 4 is a block diagram of a simulation circuit used for measuring interference noise from two different signals.

FIG. 4 is a block diagram of a simulation circuit used for the measurement of interference noise derived from two signals.

In FIG. 4, a mixer 23 is provided at the antenna of a radio receiver; in this case, a car radio with AM and FM bands, for example a Model RN 3911 manufactured by Clarion Inc. The mixer 23 synthesizes two signals: one is signal $S_1$ (of frequency $f_1$ and level $V_1$) generated by a signal generator 21 and the other is signal $S_2$ (of frequency $f_2$ and level $V_2$) generated by another signal generator 22. Using the simulator described above, the input levels $V_1$ and $V_2$ of the two signals $S_1$ and $S_2$ at the antenna are set to be almost equal within a range of from about 5 to 20 dB and the input frequency $f_2$ of the second signal $S_2$ is varied so that the absolute value of the frequency difference $f=|f_1-f_2|$ varies between zero and 15 KHz. Under such measurement conditions, the change in the terminal voltage $V_o$ (in units of $V_{rms}$, where rms is an abbreviation for root mean square) of a radio speaker 29 is measured with a volt meter 25.

Numeral 26 denotes a spectrum analyzer used for analyzing the frequency spectra of antenna input signals. Numeral 27 denotes an oscilloscope through which the waveform at the input terminal of the speaker 29 can be observed. Numeral 28 denotes a directional coupler connected at the output stage of the signal generator 21 to prevent electromagnetic interaction between the signal generators 21 and 22, and numeral 29 denotes the radio speaker.

Other measurement conditions were as follows: the signals $S_1$ and $S_2$ were non-modulated waves; the radio tuned frequency is $f_1$ and the radio volume is set so that the terminal voltage $V_o$ at the speaker 29 indicated 0.775 V (0 dB with respect to an impedance load of 600) when a signal at a frequency of 400 Hz and a modulation degree of 30% is inputted to the antenna at a level of 80 dB).

Under such conditions, the terminal voltage $V_o$ across the speaker 29 represents interference noise corresponding to the frequency difference $\Delta f$ between the two signals $S_1$ and $S_2$, known as beat noise.

Figure 5:
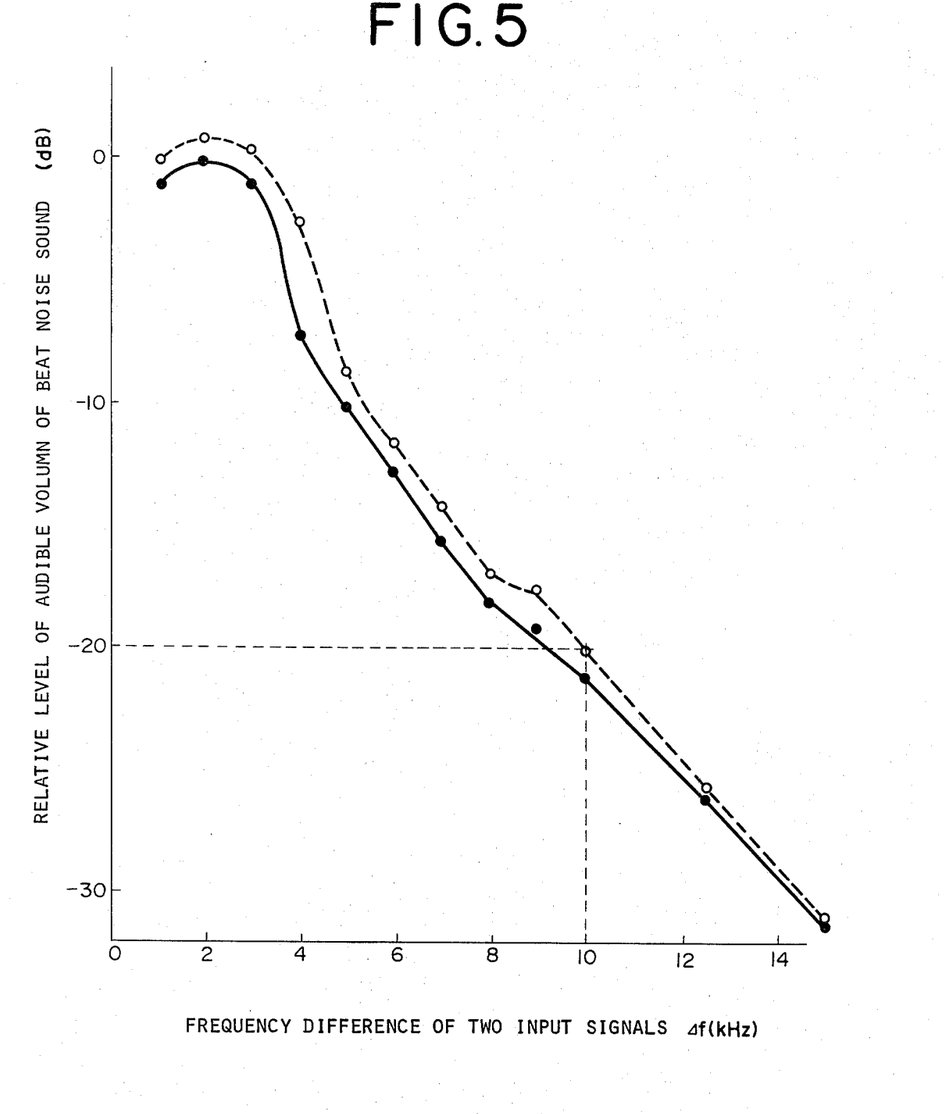
FIG. 5 is a plot of actually measured values of relative beat noise level (in dB) with respect to frequency difference $\Delta f$ (in KHz) between two input signals measured by the apparatus of FIG. 4.

FIG. 5 illustrates the relative level of the speaker terminal voltage, with an audibility correction (according to the Fletcher-Munson curve), with respect to the input frequency difference of an audible beat noise volume.

In FIG. 5, solid circles indicate a plot of the relative noise level when the input level $V_1$ (approximately equal to input level $V_2$) is set at 5 dBμ. Hollow circles indicate that the input level $V_1$ (approximately equal to the input level $V_2$) is set at 15 μdB. In this case, the two input frequencies $f_1$ and $f_2$ are such that frequency $f_1$ is approximately 80 MHz and $f_2$ equals 80 MHz plus $\Delta f$ ($f_2 = 80$ MHz $+ \Delta f$).

Figure 6:
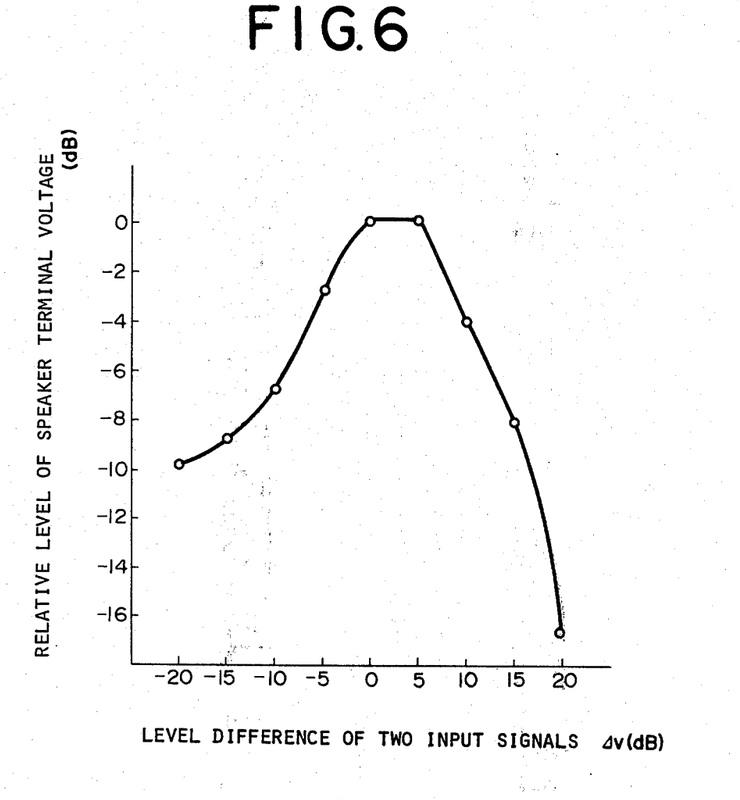
FIG. 6 is a plot of actually measured values of the relative level (in dB) of speaker terminal voltage with respect to the level difference $\Delta v$ (in dB$\mu$) between two input signals measured by the apparatus of FIG. 4.

FIG. 6 illustrates the relative level of the voltage $V_o$ across the speaker 29 with respect to the level difference $\Delta V$ of two input signals when the frequency difference $\Delta f$ is set to 1 KHz.

In FIG. 6, the input frequencies $f_1$ and $f_2$ are set at 80 MHz and 80.001 MHz, the level $V_1$ of the input signal $S_1$ is set at 5 dBμ and the reference level of the voltage $V_o$ across the speaker 29 is $-13$ dBm (at an impedance load of 600Ω).

Figure 7:
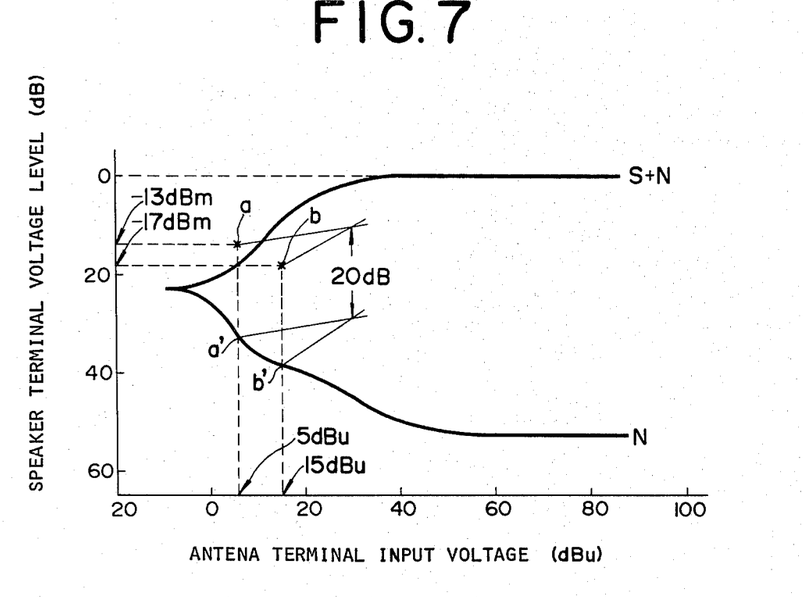
FIG. 7 is a plot of the absolute level of beat noise and the S/N ratio characteristics of radio receiving equipment mounted in an automotive vehicle.

FIG. 7 illustrates an S/N ratio characteristic graph of the exemplary radio receiving equipment 24 mounted in the automotive vehicle showing the absolute level of the beat noise volume. In FIG. 7, S+N curve indicates the speaker voltage level with respect to an input voltage at a frequency of 400 Hz and modulation degree of 30%. The N curve indicates the speaker voltage level with respect to an input voltage of non-modulated wave.

Point "a" indicates the level of beat noise when the signals $S_1$ and $S_2$ are inputted at a level such that $V_1=V_2=5$ dBμ, point "b" indicates the level of the beat noise when $V_1=V_2=15$ dBμ and the points a' and b' indicate the respective level of noise when only one signal is inputted.

Taking the measurement results described above into consideration, the following can be concluded:

As shown in FIG. 7, when several non-modulated signals, each having a frequency close to the others are received simultaneously, the beat noise is picked up by the speaker 29, the sound level of the beat noise being substantially equal to that of a modulated wave and the volume of the beat noise being approximately 20 dB higher than that produced when a single non-modulated signal is inputted.

Hence, as can be appreciated from FIG. 5, in order to suppress the noise volume level when two signals are received simultaneously, the frequency difference $\Delta f$ should be 10 KHz or higher ($\Delta f \geq 10$ KHz).

Since most receiving equipment has substantially similar characteristics as the specimen used in terms of the relationship between the frequency difference $\Delta f$ and noise level, the determined optimum condition of frequency difference between two input signals can be expected to be applicable to other radio receiving equipment.

The mechanism of generating beat noise due to interference between two input signals when the frequency difference $\Delta f$ is small is such that:

(1) an AM-wave demodulated output of AM modulated components are generated from the resultant signal of synthesizing two signals; and (2) an FM-wave demodulated output of FM modulated components are generated from the resultant signal of synthesizing two signals.

Figure 8:
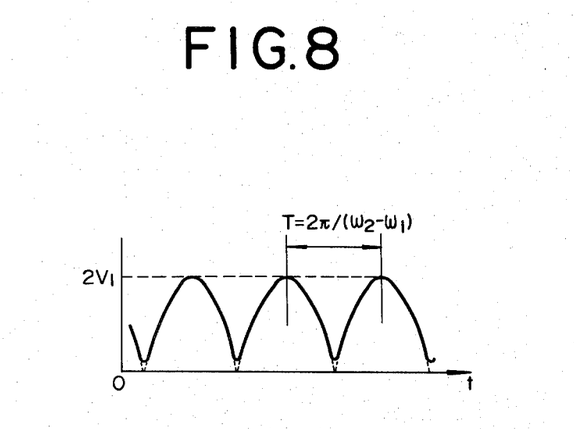
FIG. 8 is an illustration of a beat noise waveform.

Turning now to FIG. 8, it is noted that actual observation of the noise waveform from the speaker terminals by means of oscilloscope 27 indicates that the noise is substantially dominated by the AM wave demodulated output of the AM modulated frequency component as described above has a period T of $2\pi/\omega_2 - \omega_1$ and amplitude of approximately 2 $V_1$ (where $V_1 = V_2$).

Therefore, in the typical case of a noise problem caused by digital electronic devices such as microprocessors mounted in an automotive vehicle, since the level at the antenna of the higher harmonics of the clock frequencies of the digital devices ranges from approximately 5 to 20 dB, the interference noise generated when a plurality of microcomputers are operated simultaneously may appear at the output terminal, as an AM modulated wave synthesized from the demodulated higher harmonic components.

It should be appreciated from FIG. 6 that when the level difference, $\Delta V$, between two signals is large, beat noise due to the interference between these signals abruptly drops. Therefore, if higher harmonics of a plurality of clock frequencies are received by the antenna, it can be neglected provided that the level difference of the higher harmonics is large.

However, in actual practice, when a plurality of microcomputers of substantially similar constructed are mounted in an automotive vehicle and operated simultaneously, the input levels of the higher harmonics at each of the clock frequencies received at the antenna will be substantially the same and beat noise will diminish the quality of reception of the radio receiving equipment greatly.

Figure 9:
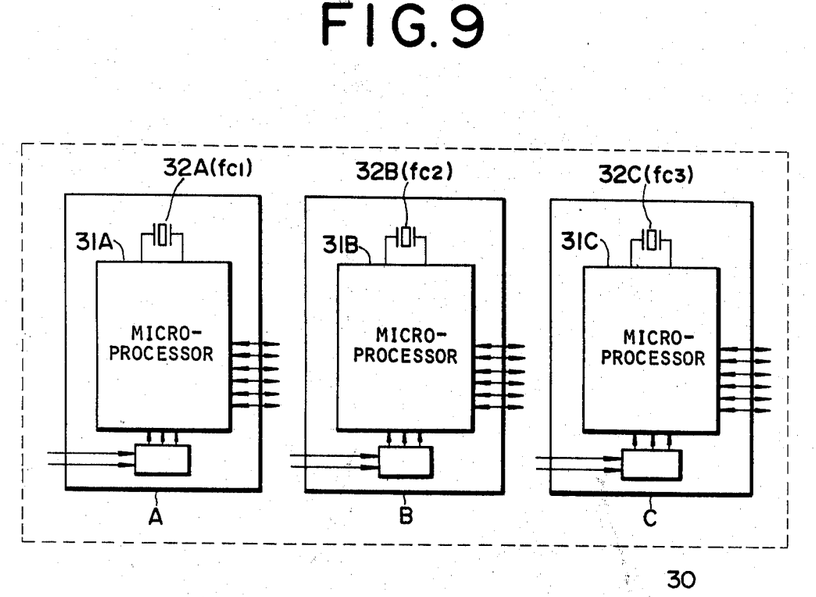
FIG. 9 is a simplified conceptual drawing illustrating a preferred embodiment according to the present invention.
Figure 10:
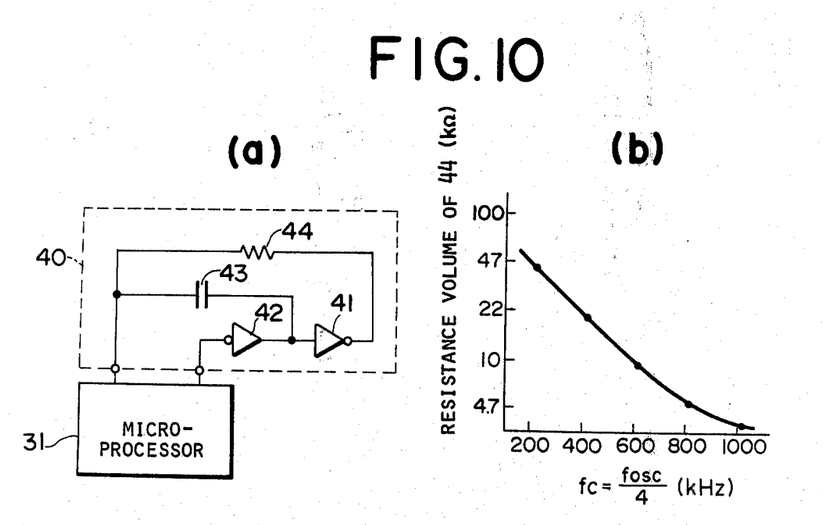
FIG. 10(a) is an exemplary clock pulse generator.
FIG. 10(b) is a characteristic curve clock pulse frequency with respect to the resistance of the clock pulse generator shown in FIG. 10(a).

FIG. 9 illustrates a preferred embodiment of the present invention which prevents such problems, in which three microcomputers A, B, and C are used as an electronic control unit incorporated into the electronic system of an automotive vehicle. Microprocessors 31A, 31B, and 31C are operated on a basis of clock pulses with frequencies $fc_1$, $fc_2$, and $fc_3$ generated from clock generators 32A, 32B, and 32C, respectively such as crystal oscillators, ceramic oscillators, etc.

According to the present invention, these clock frequencies $fc_1$, $fc_2$, and $fc_3$ are chosen so that the higher harmonics of each clock pulse within the FM broadcasting band has a frequency difference of 10 KHz or more.

The frequency difference of 10 KHz described above separates the frequencies between each clock pulse ($\Delta f$) to a maximum assuming that the fundamental frequency band of the clock pulses in the 1 MHz band is obtained as follows:

$$10 \text{ KHz} \times \frac{1 \text{ MHz}}{76 \text{ MHz}} \Delta f$$

(where 76 MHz is the lower limit of the FM broadcasting and 10 KHz is the desired frequency separation).

In actual practice, if the oscillation frequency of the clock generator is designated as 1.0 MHz, different oscillators will produce various values of the fundamental oscillation frequency due to their individual oscillation frequency deviations and temperature dependent frequency characteristics.

Such crystal oscillators used in microcomputers, e.g., crystal oscillators of AT cut and H-18u sealing type have specifications on the allowable range of dispersions as listed below.

Oscillation frequency deviation; ±20-30 ppm
Variation due to temperature; ±40 ppm (−45°−+80° C.)

Therefore, there could be inaccuracies as large as 70 ppm (70 Hz with respect to the oscillation frequency 1 MHz). In regard to the above described maximum allowable limit and including a safety factor, the frequency difference, $f_{reg}$, between clock frequencies in 1 MHz band required for avoiding interference noise may be expressed as:

$$\alpha f_{reg} = 132 + (70 \times 2) + (\text{safety factor}) = 300 \text{ Hz}$$

Listed below is an example of zones allotted to the clock frequencies when five microcomputers are used, using the determined value of the frequency difference:
Ch 1; 997,300–998,000 Hz
Ch 2; 998,300–999,000 Hz
Ch 3; 999,300–1,000,000 Hz
Ch 4; 1,000,300–1,001,000 Hz
Ch 5; 1,000,300–1,002,000 Hz The oscillation frequency of each crystal oscillator should be designated to be within a frequency band of the numerical values listed above multiplied by n (n=1, 2, 3, . . . ).

As an alternative to the clock oscillator, an oscillation circuit 40 as shown in FIG. 19(a) may be used. The oscillation circuit 40 is an LS-TTL type astable multivibrator comprising an LS-TTL inverter 41, another inverter 42, a capacitor 43, and a resistor 44.

FIG. 10(b) shows a characteristic graph of clock frequency, fc, with respect to the resistance of a resistor 44 connected between the capacitor 43 and inverter 41. In this example, the clock frequency fc is the oscillation frequency $f_{osc}$ divided by four in the microprocessor 31. Therefore, the clock frequency can be changed by selecting the value of the resistor 44.

When using an oscillation circuit such as shown in FIG. 19(a), the clock frequencies need to be designated so that the higher harmonics of each clock frequency do not fall into a range where intereference occurs.

As another alternative to the clock oscillator, another oscillation circuit comprising a ceramic oscillator may be used. Similarly in this case, the clock frequencies of the oscillation circuits need to be designated so that the higher harmonics of each clock frequency do not fall into a range where the interference occurs.

As described hereinbefore according to the present invention, even when a plurality of digital processing units are operated in synchronization with a clock pulse (e.g., a clock generator using a crystal oscillator control system using a microcomputer for controlling the amount of fuel supplied to the engine, ignition timing, EGR (exhaust gas recirculation), idling speed, etc.) interference between higher harmonics derived from each clock frequency can be prevented, and only the higher harmonics derived from individual clock frequencies will have an effect on any radio receiving equipment.

Consequently, the generation of large, constant interference noise can be prevented.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. An interference noise avoidance system for use where a plurality of digital processing units are operated in a broadcast receiver environment which is subject to noise interference; said processing units being operated in synchronization with clock pulses, comprising:

a plurality of clock pulse generating means adapted to operate within said receiver environment for generating said clock pulses, each of said plurality of clock pulse generating means being connected to at least one of said digital processing units and being operable to generate distinctly different clocking frequencies for said clock pulses; each of said clocking frequencies being preselected such that when two or more processing units operate simultaneously, any harmonics within a broadcast band of the receiver which are caused by clock pulses of one generating means have a frequency difference of at least 10 KHz from the harmonics within the broadcast band caused by clock pulses of any other generating means;

whereby interference resulting from any frequency difference of less than 10 KHz within said broadcast receiver environment is avoided.

2. The interference noise avoidance system of claim 1, wherein the frequency of each of the clock pulses is preselected to at least have a frequency difference $\Delta f$ in accordance with the following frequency equation difference:

$$f = 10 \text{ KHz} \times \frac{n \text{ Hz}}{\text{Lower Limit Frequency of the Broadcast Band}}$$

where n is equal to a fundamental frequency band of the clock pulses.

3. The interference noise avoidance system of claim 2, wherein the broadcast band is frequency modulated (FM) and each of the clock pulses is preselected to have at least a frequency difference of about 114 hertz when the lower limit of the FM band is 88 megahertz and the fundamental frequency band is 1 megahertz.

4. The interference noise avoidance system of claim 2, wherein each of the clocking frequencies is preselected such that said frequency difference is greater than the value obtained by said frequency difference equation for compensating for frequency and temperature deviations of said clock pulse generating means.

5. The interference noise avoidance system of claim 4, wherein the broadcast band is frequency modulated and each clocking frequency is preselected to have a frequency difference of substantially 300 Hz with a 1 megahertz fundamental clocking frequency band, such that said 300 Hz frequency difference assures a frequency difference of at least 10 kilohertz between the higher harmonics of the clock pulses in the FM frequency band when the lower limit of said FM band is 76 megahertz.

6. The interference noise avoidance system of claim 5, wherein each of said plurality of clock pulse generating means generates clock pulses, the frequency difference between the clock pulses being preselected to be on the order of at least 300 Hz times the harmonic multiple of the fundamental frequency band.

7. The interference noise avoidance system of claim 2, wherein at least one of said clock pulse generating means comprises a crystal oscillator of AT cut.

8. The interference noise avoidance system of claim 2, wherein at least one of said clock pulse generating means comprises an oscillation circuit having a ceramic oscillator.

9. An interference noise avoidance electronic system for use with a plurality of digital processing units operated in a frequency modulated (FM) receiver environment, said digital processing units being operated in synchronization with clock pulses, comprising:
a plurality of clock pulse generating means for generating said clock pulses, each of said clock pulse generating means being connected to one or more of said digital processing units for generating a plurality of distinctly different clock pulse clocking frequencies preselected such that higher harmonics of one clock pulse has a frequency difference of at least 10 KHz from other higher harmonics in the FM band caused by any other clock pulses, whereby any interference noise caused when two or more of said clock pulse generating means operate simultaneously within said FM receiver environment is avoided.

10. The interference noise avoidance electronic system of claim 9, wherein each of the clock pulses is preselected to have at least a frequency difference $\Delta f$, determined in accordance with the following frequency difference equation:

$$\Delta f = 10 \text{ KHz} \times \frac{n \text{ MHz}}{\text{Lower Limit Frequency of the FM Broadcasting Band}}$$

where n is a fundamental frequency band of the clock pulses.

11. The interference noise avoidance electronic system of claim 10, wherein said clock pulses have a frequency difference of substantially at least 114 Hz when the lower limit of the FM band is 88 megahertz and the fundamental frequency band is 1 MHz.

12. The interference noise avoidance electronic system of claim 10, wherein each of said clocking frequencies is preselected to have a frequency difference greater than the value obtained by said frequency difference equation for compensating for any frequency or temperature deviations.

13. The interference noise avoidance electronic system of claim 9, wherein said clock pulse generating means comprise crystal oscillators of AT cut.

14. The interference noise avoidance electronic system of claim 9, wherein said clock pulse generating means comprise oscillation circuits having ceramic oscillators.

* * * * *